United States Patent [19]

Lundin

[11] 4,195,696
[45] Apr. 1, 1980

[54] EARTHWORKING IMPLEMENT WITH OPEN CENTER FRAME SECTION

[76] Inventor: Earl A. Lundin, Rte. 1, Marietta, Minn. 56257

[21] Appl. No.: 836,048

[22] Filed: Sep. 23, 1977

[51] Int. Cl.² .............................................. A01B 37/00
[52] U.S. Cl. .................................... 172/451; 172/676
[58] Field of Search .............. 172/134, 291, 292, 451, 172/474, 478, 482, 485, 488, 489, 619, 646, 649, 650, 656, 676, 677; 111/7, 59, 60, 61, 62, 63, 64, 65, 66, 67

[56] References Cited

U.S. PATENT DOCUMENTS

| 941,951 | 11/1909 | Reynolds | 172/676 X |
|---|---|---|---|
| 956,477 | 4/1910 | Burdge | 172/482 |
| 1,083,446 | 1/1914 | Johnson | 172/619 |
| 1,358,650 | 11/1920 | Pendleton | 172/482 |
| 1,422,967 | 7/1922 | Griswold et al. | 172/134 |
| 1,547,064 | 7/1925 | Nobbs | 172/676 X |
| 1,604,721 | 10/1926 | Riepe | 172/676 |
| 1,671,507 | 5/1928 | Boldt | 172/676 X |
| 1,707,410 | 4/1929 | Neusiis | 172/676 |
| 1,769,085 | 7/1930 | Trial | 172/676 X |
| 1,872,238 | 8/1932 | Brown | 172/134 X |
| 1,886,438 | 11/1932 | Weeks | 172/676 X |
| 1,887,348 | 11/1932 | Freeman | 172/134 |
| 2,066,666 | 1/1937 | Becker | 172/676 X |
| 2,070,964 | 2/1937 | Scott et al. | 172/134 X |
| 2,224,051 | 12/1940 | Ihde | 172/134 X |
| 2,224,800 | 12/1940 | Seright | 172/134 X |
| 2,277,880 | 3/1942 | Noble | 172/134 |
| 2,319,899 | 5/1943 | Silver | 172/134 |
| 2,675,752 | 4/1954 | Wangsgard | 172/676 X |
| 3,921,726 | 11/1975 | Connor et al. | 172/646 |
| 4,014,271 | 3/1977 | Rohlf et al. | 111/7 |
| 4,120,365 | 10/1978 | Kuhn | 172/488 |

FOREIGN PATENT DOCUMENTS

| 2410290 | 9/1974 | Fed. Rep. of Germany | 172/134 |
|---|---|---|---|
| 2302010 | 9/1976 | France | 172/676 |

*Primary Examiner*—Richard T. Stouffer
*Attorney, Agent, or Firm*—Burd, Bartz & Gutenkauf

[57] ABSTRACT

An earthworking implement mounted on a three point hitch of a tractor for tilling compacted soil behind the drive wheels of the tractor. The implement has a transverse main frame including an inverted U-shaped central section carrying outwardly extended beams. Tool bars are adjustably mounted on the beams and carry earthworking tools that till the packed soil in the tracks made by the tractor wheels. The center portion of the frame is open to allow a forwardly directed tongue of a second implement, as a seed drill, to be connected to the draw bar of the tractor.

13 Claims, 5 Drawing Figures

EARTHWORKING IMPLEMENT WITH OPEN CENTER FRAME SECTION

BACKGROUND OF INVENTION

Agricultural tractors have a plurality of heavy drive wheels. The drive wheels are filled with ballast to increase the traction and the weight of the wheels. These heavy wheels, when driven on a seed bed, will compact the soil into tracks. Under some soil conditions the packed soil is relatively hard and is not readily penetrated by the conventional furrow openers or discs of a seed drill. The seed drill will then deposit the seed grain on top of the soil with very little coverage of the grain by the soil. The compact soil also becomes hard and baked, thereby further inhibiting the germination of the seed grain.

SUMMARY OF INVENTION

The invention is directed to an earthworking implement used with a draft vehicle for working the soil behind the drive wheels of the vehicle. The earthworking implement has a frame structure adapted to be releasably mounted on the hitch of the vehicle and shaped to permit the connection of a tongue of a grain drill or other implement to the conventional draw bar of the tractor. The frame structure has an inverted U-shaped mid-section that has sufficient clearance which permits the turning of the tractor without disconnecting the tongue of a second towing implement or raising the earthworking implement.

The earthworking implement is specifically provided with a main frame having a generally inverted U-shaped central portion carrying laterally outwardly directed main beams. First tool bar means are located below one of the beams. Adjustable connectors are used to mount the tool bar means to one of the main beams in a manner which permits lateral adjustment to the tool bar means relative to the beam. A second tool bar means is located between the other main beam. A second adjustable mounting means connects the second tool bar means to the other beam. Each of the earthworking tool bar means carries a plurality of spring biased earthworking tools. The tools are arranged relative to each other to work the soil in the compacted tracks made by the tractor.

The earthworking implement is readily connected and disconnected from the conventional and three point hitch of the tractor. It can be adjusted to accommodate different wheel widths and track patterns. The tool facilitates the connection of the tongue of an implement, such as a grain drill, without making alterations to the implement. The tractor and earthworking implement can be turned without disconnecting the grain drill or raising the implement out of the soil. The earthworking implement is economical and sturdy in construction and reliable and versatile in use. When used with a grain drill, the earthworking tool tills the compacted soil left by the tractor so that the grain drill will function to evenly plant the seeds in the seed bed. This facilitates a maximum and even germination of the seed grains. These and other advantages of the earthworking implement are set out in the following detailed description thereof.

IN THE DRAWINGS

DESCRIPTION OF PREFERRED EMBODIMENT

Figure 1:
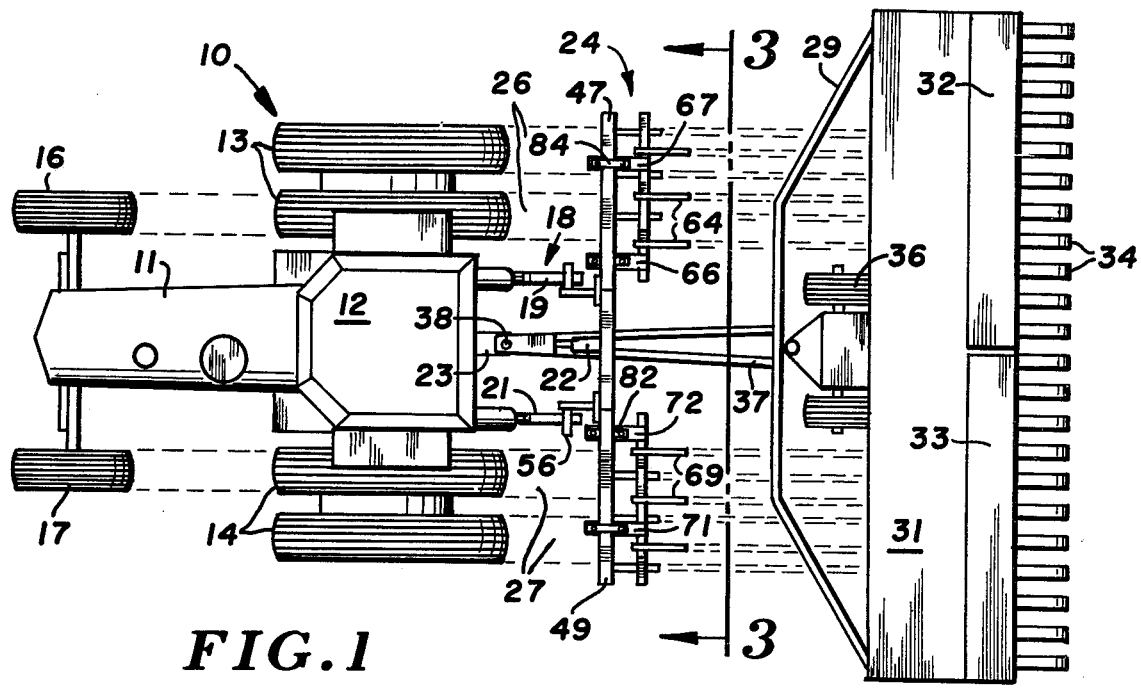
FIG. 1 is a top plan view of an agricultural tractor hitched to the earthworking implement of the invention and towing a grain drill as used in an agricultural field.

Referring to FIG. 1, there is shown an agricultural tractor indicated generally at 10 having an engine 11 located forwardly of a driver's cab 12. Two pairs of rear drive wheels 13 and 14 are drivably connected to the transmission of the tractor. The front of the tractor is supported by a pair of front steering wheels 16 and 17. A conventional three point hitch 18 is located between the rear drive wheels 13 and 14. Hitch 18 comprises a pair of rearwardly directed draft links 19 and 21 and an upper central control link 22. Control link 22 is foreshortened in FIG. 1 to show the connection of the tongue 37 to tractor draw bar 23. Links 19, 21, and 22 are connected in the conventional manner with pivot pins to the transmission casing of the tractor. Tractor 10 also has a lower draw bar 23 located generally along the central longitudinal axis of the tractor. Bar 23 is located below the control link 22, as shown in FIG. 3.

Returning to FIG. 1, an earthworking implement indicated generally at 24 is mounted on the three point hitch 18. Implement 24 functions to work the soil in the packed tracks 26 and 27 made by the tractor drive wheels 13 and 14. The drive wheels 13 and 14 are large diameter pneumatic tires. These tires are often filled with a liquid ballast to increase the weight and traction of the tires. The weight of the tractor, combined with the ballast, compresses and compacts the soil under the tires during movement of the tractor over the soil. The packed tracks 26 and 27 do not provide the optimum seed bed conditions for seeding or drilling grain into the soil. If the packed tracks 26 and 27 were not tilled, the seed would lie on top of the soil. This results in reduced germination and an uneven stand of grain with the ultimate result of a reduced yield.

A conventional seed drill 28 is located behind the earthworking implement 24. Seed drill 28 has a horizontal frame 29 carrying a transverse fertilizer hopper 31 and a pair of grain hoppers 32 and 33. A series of packer wheels 34 are located below and rearwardly of hoppers 32 and 33. Boggey support wheels 36 connected to frame 29 support frame 29 and hoppers 31, 32 and 33 on the seed bed. A forwardly directed tongue 37 is connected to the center portion of frame 29. Tongue 37 has a forward clevis end accommodating a pin 38 used to connect the tongue 37 to the draw bar 23 of the tractor.

Figure 2:
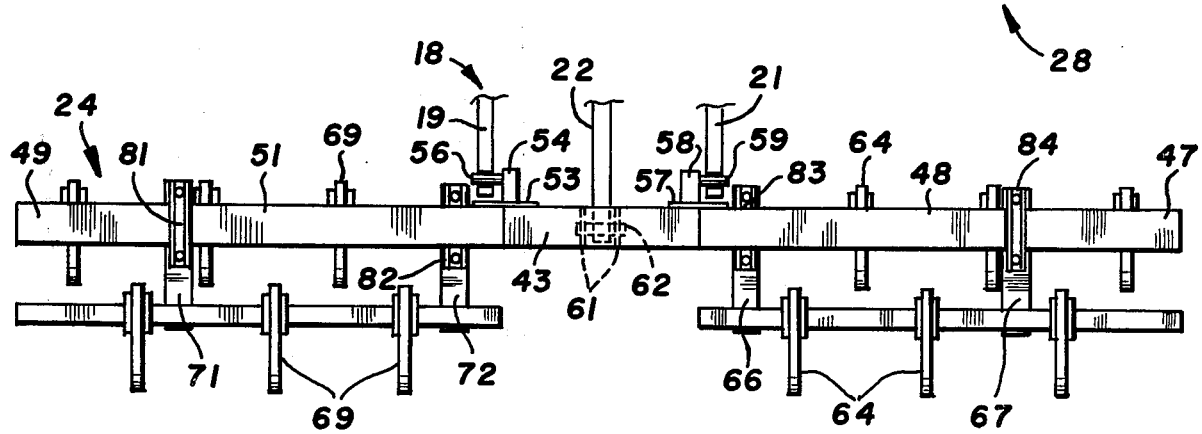
FIG. 2 is an enlarged top plan view of the earthworking implement of FIG. 1.
Figure 3:
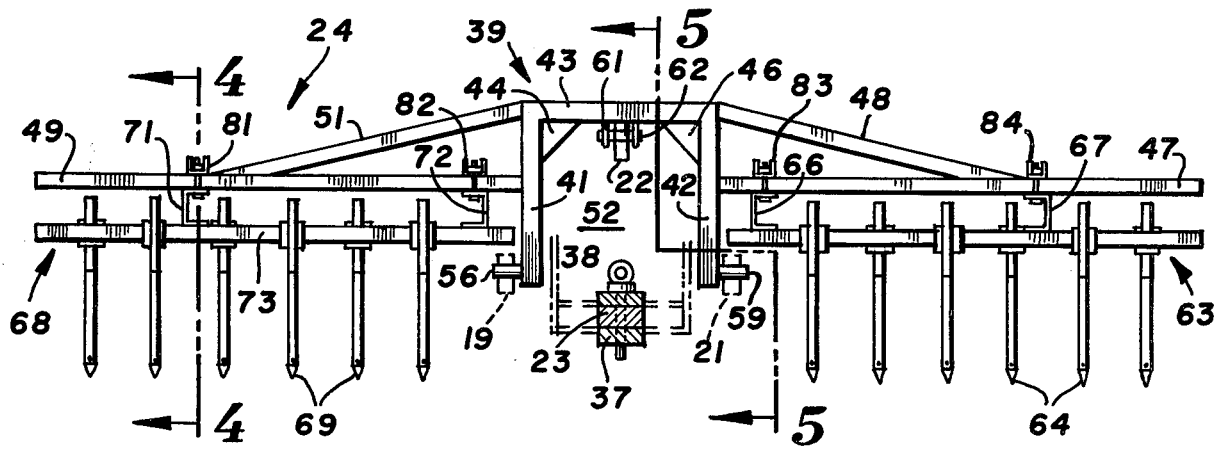
FIG. 3 is an enlarged sectional view taken along the line 3—3 of FIG. 1.

As shown in FIGS. 2 and 3, earthworking implement 24 has a transverse rigid main frame indicated generally at 39. Frame 39 has an open center section having an open bottom. Center section can be an inverted U or V. Center section comprises a pair of vertical members or posts 41 and 42. The upper ends of posts 41 and 42 are joined to a top horizontal cross member 43. Gusset plates 44 and 46 are secured to the inside corners of both members 41 and 43 and 42 and 43. The open center section of the main frame 39 permits earthworking implement 24 to be raised and lowered without disconnecting tongue 37 of grain drill 28 from draw bar 23. Implement 24 can ride up and down in the soil without contacting frame 39. Also, a limited amount of turning of the tractor can be achieved, since the space 52 between posts 41 and 42 permits angular movement of tongue 37 relative to implement 24.

A first horizontal beam 47 extends outwardly from the mid-section of post 42. The inner end of beam 47 is secured by welds or the like to post 42. A top angled brace 48 is secured at one end to the upper end of post 42. The outer end of brace 48 is secured to the approximate mid-section of beam 47.

A second horizontal beam 49 is secured to the mid-section of post 41. Beam 49 is in general horizontal alignment with first beam 47. The inner end of beam 49 is secured by welds or the like to the center portion of post 41. A top angled brace 51 has an inner end secured to the top of post 41. The outer end of brace 51 is secured to the approximate mid-section of second beam 49.

Figure 5:
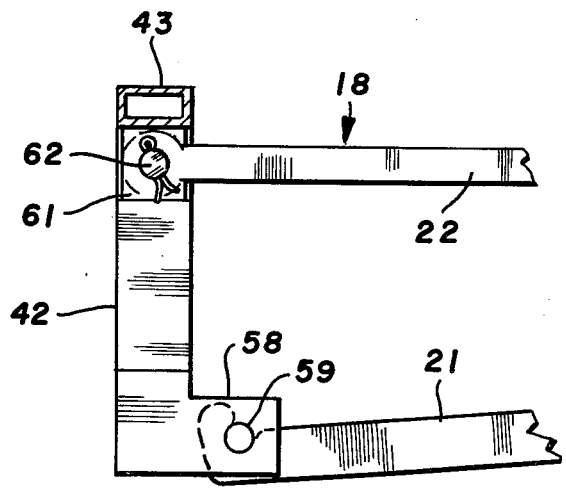
FIG. 5 is an enlarged sectional view taken along the line 5—5 of FIG. 3.

Referring to FIG. 2, a plate 53 is secured to the lower end of vertical post 41. Plate 52 carries a forwardly directed support 54. An outwardly directed lateral pin 56 is mounted on support 54. Pin 56 is accommodated by the hook portion of draft link 19 to connect the draft link to the earthworking implement. A second plate 57 is secured to the lower end of vertical member 42. A forwardly directed support 58 carrying a laterally directed pin 59 is secured to plate 57. The second draft link 21 has a hooked outer rear end accommodating the pin 59. As shown in FIGS. 3 and 5, control link 22 is connected to the mid-section of the lower part of horizontal member 43. A pair of laterally spaced downwardly directed ears 61 are secured to the bottom side of member 43. Ears 61 have transversely aligned holes to accommodate a connecting pin 62 used to pivotally connect the control link 22 to ears 61.

As shown in FIGS. 2 and 3, a first tool bar means 63 is located below and extends parallel to the first beam 47. A plurality of earthworking tools 64 are mounted on the tool bar means 63 to work the soil behind wheels 13 of the tractor. A pair of mounts 66 and 67 secure the first tool bar means 63 to first beam 47.

The second tool bar means 68 is located below and extends parallel with the second beam 49. A plurality of earthworking tools 69 are mounted on the second tool bar means 68 and function to work the soil behind wheels 14 of tractor 10. A pair of mounts 71 and 72 connect second tool bar means 68 to beam 49. The first and second tool bar means 63 and 68 and their earthworking tools mounted thereon and the mounts that connect the tool bar means to their respective means are identical in construction. The following description is limited to the second tool bar means 68 as illustrated in detail in FIG. 4.

Second tool bar means 68 has a pair of transverse tool bars 73 and 74. Bars 73 and 74 are square tubular members of structural metal. Mount 71 is a channel member having a bottom flange 76 secured by welds or the like to the top of tool bars 73 and 74. Mount 71 also has a top flange 77 located in engagement with the bottom side of beam 49. A pair of nut and bolt assemblies 78 and 79 cooperate with a channel member 81 to clamp the mount 71 to the beam 49. Nut and bolt assemblies 78 and 79 can be released so that the mount, along with the tool bars 73 and 74, can be laterally adjusted on the beam 49.

Mount 72 is identical with mount 71 and is adjustably mounted to the beam 49 with a pair of nut and bolt assemblies and a channel member 82. Mount 72 is secured by welds to the inner ends of the tool bars 73 and 74. This permits the operator to laterally adjust the position of tools 69.

Tool bar means 63 also has a pair of tool bars secured by welds or the like to the mount 66 and 67. Nut and bolt assemblies acting on channel members 83 and 84 adjustably connect mounts 66 and 67 to the beams 47 and permit the lateral adjustment of the mounts 66 and 67 and tool bar means 63 relative to the beam 47. This permits the operator to laterally adjust the position of tools 64.

Figure 4:
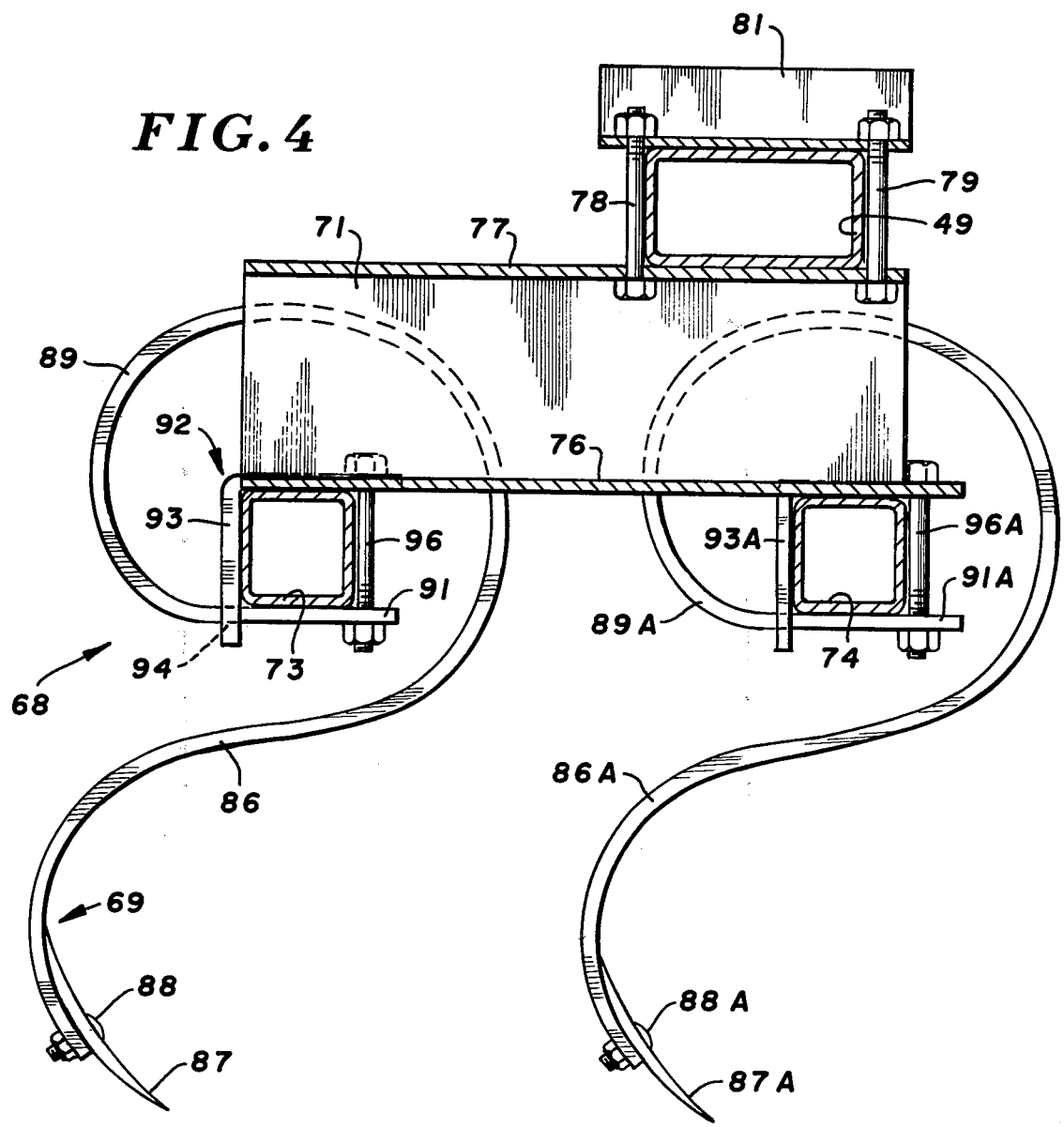
FIG. 4 is an enlarged sectional view taken along the line 4—4 of FIG. 3.

The earthworking tools 69 are best shown in FIG. 4. Each tool 69 has a reversed curved spring standard 86 having a downwardly and forwardly curved end carrying a removable tool or shovel 87. A bolt 88 releasably connects the shovel to the standard 86. The upper end of standard 86 has a rearwardly turned loop 89 that extends over the top of the tool bar 73. Loop 89 terminates in a forwardly directed end 91. End 91 is mounted on tool bar 73 with a clamp indicated generally at 92. The clamp 92 permits the standard 87 to be adjustably mounted along the length of the tool bar 73. Clamp 92 comprises a right angle member 93 located in engagement with the top and rear side of tool bar 73. The lower portion of member 93 has a transverse slot 94 accommodating end 91. A nut and bolt assembly 96 secures the opposite end of right angle member to the end of end 91 and thereby clamps the standard 86 to tool bar 73. The forward tool has the same structure designated the same reference numbers with the suffix A. An example of this clamp structure is shown by Howes in U.S. Pat. No. 3,896,883. Other types of clamps and harrowing teeth can be mounted on tool bars 73 and 74. Examples of suitable harrow teeth structure are shown by Andersen in U.S. Pat. Nos. 2,806,336 and 3,279,869.

Returning to FIG. 1, three spring harrows are used to cultivate the soil in each of the packed tracks made by the dual wheels 13 and 14. Two standards 86 can be mounted on the rear tool bars 73. One standard is mounted on the forward tool bar 77 for each track. Alternatively, the two standards can be mounted on the forward tool bar 74 and one standard mounted on the rear tool bar 73. The standards 86, being transversely adjustable along the tool bars 73 and 74 by virtue of the clamps 73, can be adjusted relative to the tracks of the vehicle to provide for the maximum tillage of the compacted soil in the tire tracks.

The open center section of the main frame 39 can have an inverted V-shape comprising two side members or posts that converge upwardly. The side members can be secured to a short base or top member. The inclined side members allow the tongue 22 to ride up when making a short turn.

While there has been shown and described a preferred earthworking implement with a spring tool harrow, it is understood that changes in the structure and harrowing tools can be made by those skilled in the art without departing from the invention. The invention is defined in the following claims.

The embodiments of the invention in which an exclusive property or privilege is claimed are defined as follows:

1. An earthworking implement adapted to be mounted on a three-point hitch of a draft vehicle comprising: a transverse frame having an open center section with an open bottom, said center section having a pair of upright posts and a top horizontal member secured to the upper ends of the posts, means secured to the midsection of the horizontal member adapted to be attached to the control link of the three-point hitch, a first generally horizontal beam secured to the outside of a middle section of one post, a second generally horizontal beam secured to the outside of a middle section of the other post, a first brace secured to the top of one post and a mid-section of the first beam, a second brace secured to the top of the other post and a mid-section of the second beam, means secured to the lower end of each post adapted to be coupled to a draft link of the three-point hitch, first tool bar means located adjacent the first beam, first means mounting the first tool bar means on the first beam, said first means comprising first clamp means operable to hold the first tool bar means at a selected longitudinal position relative to the first beam, said first clamp means being releasable to allow the first tool bar means to be longitudinally adjusted along the length of the first beam, first earthworking tools mounted on the first tool bar means, second tool bar means located adjacent the second beam, second means mounting the second tool bar means on the second beam, said second means comprising second clamp means operable to hold the second tool bar means at a selected longitudinal position relative to the second beam, said second clamp means being releasable to allow the first tool bar means to be longitudinally adjusted along the length of the second beam, and second earthworking tools mounted on the second tool bar means.

2. The implement of claim 1 wherein: the first and second clamp means each include a pair of mounts secured to the adjacent tool bar means, said mounts being located in engagement with the adjacent beam, a pair of members, and means clamping the members and mounts to the adjacent beam.

3. The implement of claim 2 wherein: the first tool bar means and second tool bar means each include a pair of transverse bars, said bars being laterally spaced from each other and extended longitudinally parallel to each other below the horizontal beams.

4. The implement of claim 1 wherein: the first tool bar means and second tool bar means each include a pair of transverse bars.

5. The implement of claim 1 wherein: the first tool bar means has a pair of transverse first bars, said first clamp means comprising a pair of first mounts secured to the first bars and means adjustably connecting the first mounts to the first beam, the second tool bar means has a pair of transverse second bars, said second clamp means comprising a pair of second mounts secured to the second bars, and means adjustably connecting the second mounts to the second beam, said first earthworking tools being mounted on the first bars, and said second earthworking tools being mounted on the second bars.

6. The implement of claim 5 wherein: each earthworking tool has a reverse curved spring standard, and means mounting the standards on the bars.

7. The structure of claim 1 in combination with: a tractor having drive wheels which form tracks of compact soil when moving over the soil, said tractor including a bar type hitch and a three-point hitch having a top control link and a pair of draft links, said first and second earthworking tools operable to work the tracks of compact soil behind the drive wheels means connecting the control link to a mid-portion of the top horizontal member of the frame, means connecting the draft links to opposite lower ends of the posts of the frame, whereby the frame can be lowered or raised by the three-point hitch, said draft link connecting means being outwardly of said open bottom thereby to render said open bottom substantially unobstructed, said open center section being generally longitudinally aligned with said bar-type hitch whereby a second implement can be coupled thereto without interfering with the earthworking implement by virtue of the substantially unobstructed open bottom.

8. In combination: a tractor having drive wheels which form compact tracks of soil when moved over the soil, said tractor having a first hitch means, and a second hitch means, an earthworking implement coupled to the first hitch means, said implement including a transverse frame having an open center section with an open bottom longitudinally aligned with the second hitch means whereby a second implement can be coupled to the second hitch means without interfering with the first implement, said center section having a pair of upright posts and a top horizontal member secured to the upper ends of the posts, means secured to the midsection of the horizontal member connected to the first hitch means, said frame having a first beam secured to a mid-section of and extended transversely from the outside of one post, and a second beam secured to a mid-section of and extended transversely from the outside of the other post, a first brace secured to the top of one post and a mid-section of the first beam, a second brace secured to the top of the other post in a mid-section of the second beam, means securing the lower end of each post to the first hitch means, first tool bar means located adjacent the first beam, first means mounting the first tool bar means on the first beam, said first means comprising first clamp means operable to hold the first tool bar means at a selected longitudinal position relative to the first beam, said first clamp means being releasable to allow the first tool bar means to be longitudinally adjusted along the length of the first beam, first earthworking tools mounted on the first tool bar means, said first earthworking tools being longitudinally aligned with the tracks of compact soil made by one wheel of the tractor and operable to work the compact soil, second tool bar means located adjacent the second beam, second means mounting the second tool for means on the second beam, said second means comprising second clamp means operable to hold the second tool bar means at a selected longitudinal position relative to the second beam, said second clamp means being releasable to allow the first tool bar means to be longitudinally adjusted along the length of the second beam, and second earthworking tools mounted on the second tool bar means, said second earthworking tools being longitudinally aligned with the tracks of compact soil made by the other wheel of the tractor and operable to work the latter compact soil.

9. The structure of claim 8 wherein: the first and second clamp means each include a pair of mounts secured to the adjacent tool bar means, each mount being located in engagement with the adjacent beam, a pair of members and means clamping the members and mounts to the adjacent beam.

10. The structure of claim 8 wherein: the first hitch means is a three-point hitch having a pair of draft links and a control link coupled to the frame and means secured to the mid-section of the horizontal member attached to the control link.

11. The structure of claim 8 wherein: the first tool bar means and second tool bar means each include a pair of transverse bars.

12. The structure of claim 8 wherein: the first tool bar means has a pair of transverse first bars, said first clamp means comprising a pair of first mounts secured to the first bar and means adjustably connecting the first mounts to the first beam to allow transverse adjustment of the first bars relative to the first beam, said second tool bar means having a pair of transverse second bars, said second clamp means comprising a pair of second mounts secured to the second bars and means adjustably connecting the second mounts to the second beam whereby the second bars are transversely adjustable relative to the second beam, said first earthworking tools being mounted on the first bars, and said second earthworking tools being mounted on the second bars.

13. The structure of claim 12 wherein: each earthworking tool has a reverse curved spring standard, and means mounting the standard on the bars.

* * * * *